United States Patent [19]
Porazinski

[11] 3,779,484
[45] Dec. 18, 1973

[54] FILM MAGAZINE WITH DRIVE CAPSTAN

[75] Inventor: Robert F. Porazinski, Norridge, Ill.

[73] Assignee: Bell & Howell Co., Chicago, Ill.

[22] Filed: Nov. 22, 1971

[21] Appl. No.: 201,041

[52] U.S. Cl.................. 242/199, 242/206, 242/209, 352/78
[51] Int. Cl. .......................................... G03b 23/04
[58] Field of Search.................. 242/199, 200, 198, 242/197, 54.1, 194, 201, 202, 206, 209, 210; 352/72, 78; 179/100.2 Z; 274/4 C, 4 D, 4 E, 11 D, 11 C; 222/49.51

[56] References Cited
UNITED STATES PATENTS

| | | | |
|---|---|---|---|
| 3,348,786 | 10/1967 | Miller et al. | 242/200 X |
| 3,197,151 | 7/1965 | Sparks et al. | 242/198 |
| 2,612,565 | 9/1952 | Heller | 242/198 |

Primary Examiner—George F. Mautz
Attorney—J. Robert Stapleton

[57] ABSTRACT

A film magazine or cassette for cameras, projectors, recorders, or the like. The magazine includes a film supply reel and a film take-up reel disposed within an enveloping wall structure for rotation about generally parallel axes to carry convoluted film. A capstan assembly, including a roller or hub, is rotatably mounted on the wall structure and engages the film for transferring the film from the supply reel to the take-up reel. The capstan is operatively connected to the take-up reel by a friction belt. A roller-type overrunning clutch forms an integral part of the capstan and is adapted to receive a round shaft from an appropriate photographic apparatus, projector, recorder, or the like, to permit the shaft to over-run the capstan and thereby maintain tension in the film between the supply reel and the capstan.

5 Claims, 4 Drawing Figures

PATENTED DEC 18 1973  3,779,484
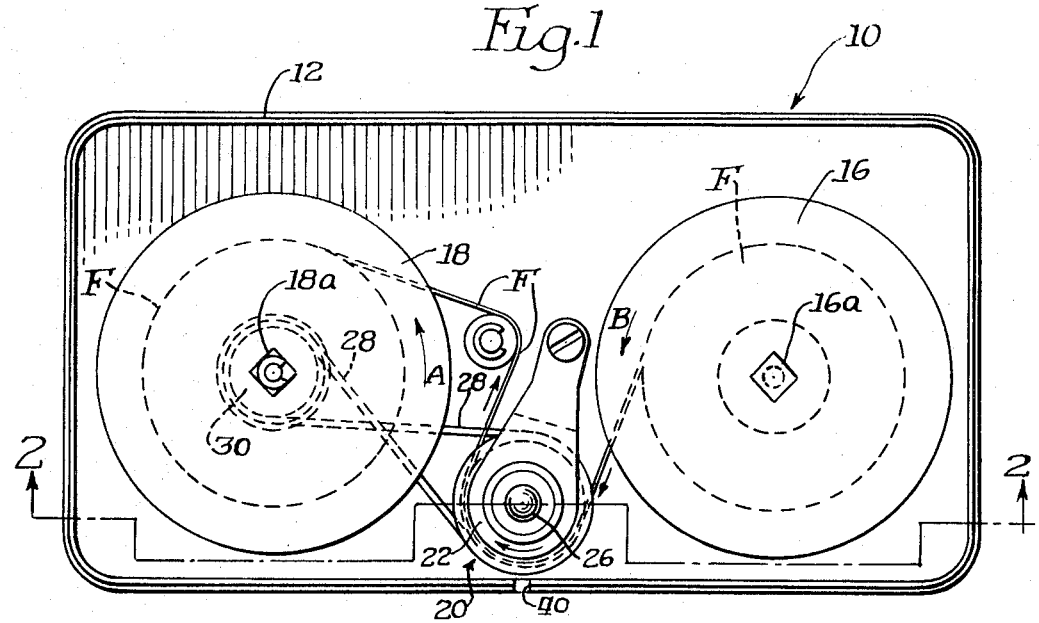
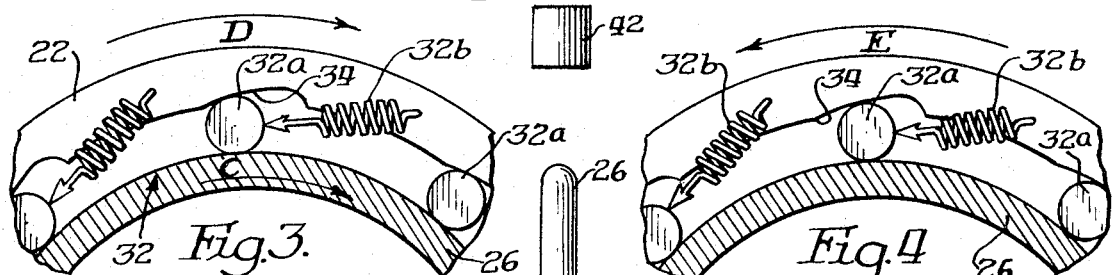
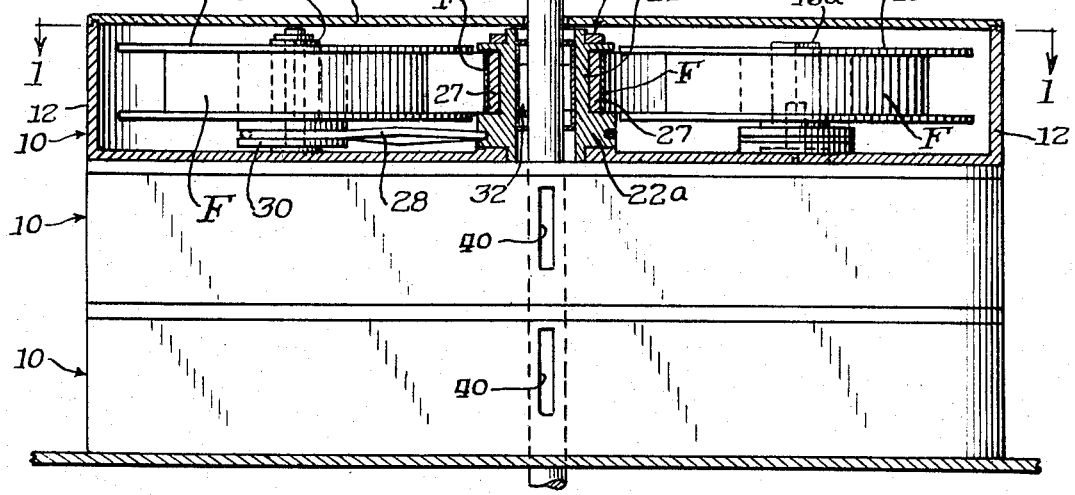
Inventor:
Robert F. Porazinski.

FILM MAGAZINE WITH DRIVE CAPSTAN

SUMMARY OF THE INVENTION

The present invention relates to film or tape apparatus and in particular to a cassette or magazine for a camera, projector, recorder, or the like, the magazine containing the film or tape and having a driving capstan engageable with the film in the magazine to draw the film past a lens, sound head, or the like.

Still more particularly, the invention relates to improvements in film or tape magazines or cassettes of the type wherein two reels, a supply reel and a take-up reel, are rotatably mounted in an enveloping wall structure or housing, the reels carrying convoluted film and the magazine or cassette including a capstan for transferring the convoluted film from the supply reel to the take-up reel in response to rotation of the capstan and the take-up reel.

With apparatus of the character described, there have been difficulties in maintaining proper tension on the film not only between the take-up reel and the capstan, but also between the capstan and the supply reel. The tension varies as the film is transferred due to the changes in diameter of the convoluted film as it is wound onto or off of the respective reels. This invention is directed to a new and improved structure designed to maintain proper tensions on the film between the capstan and the take-up and supply reels.

The principal object, therefore, is to provide a new and improved film or tape magazine or cassette for cameras, projectors, recorders, or a like apparatus.

In the exemplary embodiment of the invention, the supply reel and the take-up reel are disposed on or in an enveloping wall structure for rotation about generally parallel axes for carrying convoluted film. A film drive capstan assembly, including a hub or roller, is rotatably mounted on the wall structure for engaging the film in the magazine to draw it past a lens, sound head, or the like. Drive means in the form of a friction belt is operatively connected by pulley means to the take-up reel and the capstan roller so that a supply of convoluted film on the supply reel is transferred to the take-up reel in response to rotation of the capstan and the take-up reel. The friction belt is capable of slipping to prevent undue tension on the film between the take-up reel and the capstan. An overrunning clutch is operatively associated with the capstan and is adapted to receive a shaft from an appropriate photographic apparatus, projector, recorder, or the like, to permit the shaft to overrun the capstan and thereby maintain tension in the film between the supply reel and the capstan.

In the preferred embodiment of the invention, the overrunning clutch is an integral part of the film drive capstan assembly and includes a plurality of axially extending roller members spring biased into a wedging condition between an inner surface of the capstan hub or roller and the outer surface of a round shaft during the driving condition of the clutch. The clutch overruns when the tension in the film exceeds the force of the spring means. Such a structure eliminates the need for splined, flattened or keyed drive shafts. The drive shaft need only be of a diameter compatible with the clutch diameter selected. By so permitting the utilization of a simple round drive shaft, multiple film magazines may be driven from a single common shaft, such as by "stacking" the magazines.

Other objects, features and advantages of the invention will become apparent from the following detailed description taken in connection with the accompanying drawings.

DESCRIPTION OF THE DRAWINGS

FIG. 1 is a plan view of a film or tape magazine or cassette embodying the concepts of the present invention, with the lid removed.

FIG. 2 is an elevational view of a plurality of magazines stacked on a common drive shaft, with the top magazine shown in section as taken generally along the line 2—2 of FIG. 1;

FIG. 3 is a somewhat schematic view of a portion of the overrunning clutch means of the present invention, in its driving condition, between the drive shaft and capstan hub; and FIG. 4 is a view similar to that of FIG. 3, but with the clutch in an overrunning condition.

DETAILED DESCRIPTION OF THE INVENTION

Referring to the drawings in greater detail, the film or tape magazine or cassette of the present invention is shown in FIGS. 1 and 2 generally by the numeral 10. The magazine includes an enveloping wall structure or housing 12 having an upper lid portion 14 providing access to the interior of the housing. A film supply reel or spool 16 and a film take-up reel or spool 18 are disposed within the housing 12 for rotation about generally parallel axes defined by shaft means 16a and 18a, respectively, for carrying convoluted film F. A film drive capstan assembly, generally designated 20, and including a capstan roller or hub 22 (FIG. 2), is rotatably mounted within the housing 12 by means of a hold-down arm 24 for rotation about an axis defined by a drive shaft 26 which extends through the magazine 10 generally parallel to the axes of rotation of the take-up and supply reels 18 and 16, respectively. The film F is wrapped around the capstan hub 22 and engages a friction surface in the form of a belt 27 about the capstan hub.

Drive means in the form of a friction belt 28 operatively connects the take-up reel 18 and the capstan hub 22 by means of a pulley member 30 on the take-up reel 18 and a pulley portion 22a on the capstan hub 22. Thus, rotation of the capstan hub 22, through the friction belt 28, drives the take-up spool 18 in the direction of arrow A (FIG. 1) so that a supply of convoluted film on the supply reel is transferred to the take-up reel, the supply reel rotating in the direction of arrow B (FIG. 1). The pulley portion 22a of the capstan hub 22 is slightly larger in diameter than the diameter of the pulley 30 on the take-up reel 18. Thus, by maintaining sufficient tension in the belt 28 to drive the take-up spool 18 but to permit slipping of the belt relative to the take-up spool, the take-up spool is driven slightly faster than the film drive capstan so that a certain amount of tension is maintained on the film from an empty take-up spool to full spool capacity (i.e., as the diameter of the convoluted film on the take-up reel increases).

An overrunning clutch means, generally designated 32 in FIGS. 3 and 4, is provided as an integral part of the film drive capstan assembly 20. The overrunning clutch means is shown somewhat schematically in FIGS. 3 and 4 and includes a plurality of roller members 42a which are biased by springs 32b into a wedging condition between the capstan hub 22 and the outer surface of the round drive shaft 26. The overrunning clutch provides for driving the capstan, through the shaft 26, but permits the shaft to overrun the capstan and thereby maintain tension in the film F between the supply reel and the capstan assembly 20. More particularly, referring to FIG. 3, as the drive shaft 26 rotates in the direction of arrow C, due to the wedging action of the rollers 32 against the outer surface of the shaft 26 and inner surface portions 34 of the capstan hub 22, the capstan hub will be driven in the same direction, as indicated by the arrow D (FIG. 3). However, should tension in the film between the film supply reel 16 and the capstan assembly 20 exceed the biasing force of springs 32b, the shaft overruns the capstan hub or, vice versa, the capstan hub overruns the shaft in the direction of arrow E (FIG. 4) to thereby maintain tension in the film between the supply reel and the capstan without damaging the magazine apparatus.

With the magazine structure described above, it will be understood that the need for splined, flattened or keyed drive shafts is eliminated. Having the overrunning clutch and capstan hub an integral part of the capstan assembly as well as the film magazine assembly itself, the drive shaft 26 need only be of a diameter compatible with the roller type overrunning clutch 32. By using the simple round drive shaft, multiple film magazines may be driven from one common shaft, as is seen in FIG. 2. The housing for each magazine may have an individual opening 40, or other similar means, for exposing the film to appropriate lens structures 42 (FIG. 1), sound heads, recorder heads, or other similar apparatus.

The foregoing detailed description has been given for clearness of understanding only and no unnecessary limitations should be understood therefrom as some modifications will be obvious to those skilled in the art.

I claim:

1. A film or tape magazine for a camera, projector, recorder, or the like, comprising an enveloping wall structure, a supply reel and a take-up reel disposed on said wall structure for rotation about generally parallel axes for carrying convoluted film, a film drive capstan hub rotatably mounted on said wall structure, drive means operatively connecting said take-up reel and said capstan so that a supply of convoluted film on said supply reel is transferred to said take-up reel in response to rotation of the capstan and the take-up reel, and means defining an overrunning clutch operatively associated with said capstan and adapted to receive a shaft from an appropriate photographic apparatus, projector, recorder, or the like, in driving engagement therewith, said overrunning clutch including at least one member for effecting driving engagement between said shaft and said capstan responsive to rotation of said shaft in a preselected direction, said at least one member being spring biased by a predetermined force into its driving condition during rotation of said shaft in said preselected direction only when the tension in the film between the capstan and the supply reel does not exceed the predetermined spring bias force whereby the shaft is permitted to overrun the capstan and thereby maintain tension in the film between the supply reel and the capstan.

2. The film magazine of claim 1 wherein said drive means operatively connecting the take-up reel and the capstan includes a friction belt means capable of slipping to prevent undue tension on the film between the take-up reel and the capstan.

3. The film magazine of claim 1 wherein said overrunning clutch means is adapted to receive a round shaft.

4. The film magazine of claim 3 wherein said at least one member comprises a plurality of axially extending roller members spring biased into a wedging condition between the capstan and the outer surface of said shaft during the driving condition of the clutch.

5. The film magazine of claim 1 wherein said overrunning clutch means is an integral part of a film drive capstan assembly which includes said film drive capstan hub.

* * * * *